United States Patent [19]

Spiero

[11] Patent Number: 4,480,265
[45] Date of Patent: Oct. 30, 1984

[54] PAL COMB FILTER

[75] Inventor: Richard C. Spiero, Eindhoven, Netherlands

[73] Assignee: U.S. Philips Corporation, New York, N.Y.

[21] Appl. No.: 412,632

[22] Filed: Aug. 30, 1982

[30] Foreign Application Priority Data

Sep. 4, 1981 [NL] Netherlands ............ 8104101

[51] Int. Cl.$^3$ ............................................. H04N 9/535
[52] U.S. Cl. ................................... 358/31; 358/328; 358/329
[58] Field of Search ..................... 358/31, 328, 329

[56] References Cited

U.S. PATENT DOCUMENTS

| | | | |
|---|---|---|---|
| 4,136,358 | 1/1979 | Clemens | 358/329 |
| 4,200,881 | 4/1980 | Carnt | 358/31 |
| 4,282,545 | 8/1981 | Bragas | 358/329 |
| 4,345,268 | 8/1982 | Clarke | 358/31 |

Primary Examiner—Michael A. Masinick
Attorney, Agent, or Firm—Thomas A. Briody; William J. Streeter; Edward W. Goodman

[57] ABSTRACT

A PAL comb filter having a first and a second parallel transmission path. The first path includes a time delay network. This time delay network has a time delay equal to one line period H instead of two line periods as in conventional PAL comb filters. For this purpose a PAL inverter is arranged in one of the two paths. Alternatively, said PAL phase inversion can be switched in such a way that said inversion is effected either in the first or in the second path, change-over causing an additional PAL phase inversion of the output signal of said comb filter, which may be employed in video recording systems with parallel tracks in which the PAL phase is aligned in directions perpendicular to the tracks by the use of additional PAL phase inversions during recording, and in video recording systems in which said alignment is not used, in order to ensure, inter alia during fast-motion playback, that the PAL phase inversion sequence in the reproduced signal is not disturbed.

7 Claims, 18 Drawing Figures

PAL COMB FILTER

BACKGROUND OF THE INVENTION

The invention relates to a PAL comb filter, for use in an apparatus for playing back video signals recorded in adjacent tracks on a record carrier for chroma crosstalk reduction by means of chroma carrier phase inversion, comprising a first and a second transmission path, input means for applying a PAL chroma signal to the two transmission paths, a delay network for delaying the PAL chroma signal in the first path relative to the PAL chroma signal in the other path, and a signal combination circuit for combining the PAL chroma signal in the second path and the PAL chroma signal delayed in the first path with the correct polarity relative to each other in such a way that the result of this combination is again a PAL chroma signal. In this respect a PAL chroma signal is to be understood to mean a chroma signal in which the phase of one of two quadrature-modulated color components changes every alternate line. Consequently, the term "PAL chroma signal" is not limited to inter alia the standard television carrier frequency of 4.433 MHz.

Such a comb filter is used for filtering PAL chroma signals in, for example, video cassette recorders and video disk systems. In particular, in recording and playback systems in which video signals are or have been recorded in parallel tracks, such a PAL comb filter is used for suppressing chroma crosstalk from adjacent tracks. A disadvantage of the known PAL comb filters is that they require the use of a delay network with a time delay equal to the duration of two lines of the video picture, which inter alia gives rise to a vertical shift of the color picture relative to the luminance picture and a degradation of the resolution in the vertical direction, which effects are particularly annoying in video recording, when magnetic copying video tapes. A solution to this problem is to convert the PAL chroma signal into a quasi-NTSC chroma signal and, after filtration, reconvert it, so that it suffices to use a delay network having a time delay equal to one line period of the video picture. The disadvantage of this is that the video signal must be switched over every alternate line, which gives rise to phase errors in the resulting PAL chroma signal with consequent color errors. A further disadvantage is that owing to this quasi PAL-NTSC conversion, the advantages of PAL coding are lost in that part of the video system where the quasi-NTSC signal is processed.

SUMMARY OF THE INVENTION

It is an object of the invention to provide a PAL comb filter which reduces color shifting and which provides a higher resolution than the known PAL comb filter without the use of quasi PAL-NTSC conversion. To this end, the invention is characterized in that the delay network exhibits a time delay such that in the first path the PAL chroma signal is delayed by a time corresponding to one line of a video picture relative to the PAL chroma signal in the second path, and PAL-phase inversion means are included for inverting the PAL-phase of the signal in one of the two paths.

When recording video signals in parallel tracks on a record carrier, in order to prevent color errors during reproduction, via scanning of the record carrier across the tracks, as in a playback mode in which the program is reproduced in fast-motion, the PAL chroma signal is subjected to a periodic additional PAL phase inversion in order to render the PAL-phases in adjacent track portions equal to each other. During reproduction in the normal playback mode, and in systems where the PAL phase alternates from track to track in the fast-motion mode, the PAL chroma signal should then be subjected to corresponding PAL-phase inversions. For this purpose, the PAL phase comb filter in accordance with the invention may further be characterized in that the PAL-phase inversion means are controllable in such a way that the PAL-phase inversion is effected either in the first or in the second transmission path in response to a control signal. By alternately effecting the PAL phase inversion in the one path or the other, an additional PAL phase inversion is obtained in the output signal, while the comb-filter operation is not affected.

A further characteristic feature of this embodiment is that the PAL-phase inversion means comprises a first switchable PAL-phase inverter arranged in the first path and a second switchable PAL-phase inverter arranged in the second path, control means being provided for alternately switching on one of the two PAL-phase inverters in response to the control signal. A PAL comb filter for use in a PAL video system in which the PAL chroma signal having a first carrier frequency is converted into a PAL chroma signal having a second carrier frequency, may further be characterized in that the PAL-phase inversion means comprises frequency mixing means for mixing the PAL chroma signal having a first carrier frequency with a signal having a frequency equal to the sum of the first and the second carrier frequencies, in such a way that mixing is effected in both transmission paths of the comb filter. For use in a PAL video system in which the PAL chroma signal having a first carrier frequency is converted into a PAL chroma signal having a second carrier frequency, the PAL comb filter, with respect to the introduction of additional PAL phase inversions, may further be characterized in that the first switchable PAL phase inverter comprises a first mixing stage and the second switchable PAL phase inverter comprises a second mixing stage for converting the PAL chroma signal having the first carrier frequency to the second carrier frequency, the control means comprises a mixing-signal generator for supplying a first mixing signal of a frequency equal to the sum of the first and the second carrier frequencies, and a second mixing signal of a frequency equal to the difference of the first and the second carrier frequencies, and further comprises switching means which can be switched over by said control signal for applying, in a first position, the first mixing signal to the first mixing stage and the second mixing signal to the secong mixing stage and for applying, in a second position, the second mixing signal to the first mixing stage and the first mixing signal to the second mixing stage. Mixing with the sum of said frequencies then results in conversion of the PAL chroma signal to the second carrier frequency with PAL-phase inversion, while mixing with the difference of the frequencies results in said conversion without PAL-phase inversion. In this way the comb-filter action, the additional PAL-phase inversion, and the conversion of the PAL chroma carrier are combined in a very simple manner.

This advantageous embodiment may further be characterized in that between the mixing-signal generator and the first mixing stage, there is arranged a first switchable mixing-signal-phase inverter, and between the mixing-signal generator and the second mixing stage, there is arranged a second switchable mixing-signal-phase inverter for inverting the carrier phase of the PAL chroma signal of the second carrier frequency. Thus, a polarity change of the PAL chroma carrier is achieved in a simple manner, which is necessary to cancel polarity changes introduced during recording in order to reduce the effect of chroma crosstalk.

For use in a PAL comb filter to be employed in a video system in which, for recording the video signals, the PAL chroma signal having the second carrier frequency is converter into a PAL chroma signal having the first carrier frequency, this embodiment may further be characterized in that an output, on which the PAL chroma signal having the second carrier frequency is available, is connected to an output of the second mixing stage via a band-pass filter which is tuned to the second carrier frequency.

DESCRIPTION OF THE DRAWINGS

The invention will now be described in more detail with reference to the drawings, in which.

DESCRIPTION OF THE PREFERRED EMBODIMENT

Figure 1A:
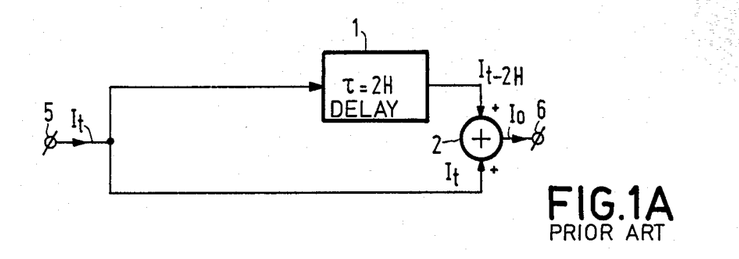
FIGS. 1A and 1B show a known comb filter for PAL chroma signals, FIG. 1A showing the circuit diagram and FIG. 1B a diagram to illustrate the operation of the filter.
Figure 1B:
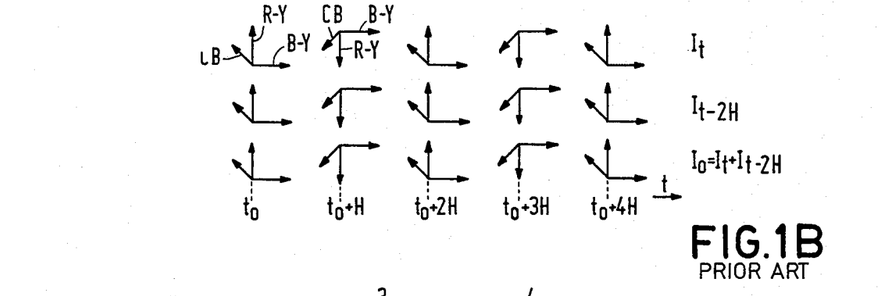

FIG. 1 represents a known comb filter for PAL chroma signals, FIG. 1A representing the circuit diagram and FIG. 1B a diagram to illustrate the operation of the filter.

A PAL chroma signal $I_t$ (FIG. 1B) is represented as a system of three signals represented by vectors, namely the color components R-Y and B-Y and the color burst CB, which components are modulated on a carrier wave of a frequency $f_o$, specifically 4.433 MHz. In a PAL chroma signal the R-Y component and the color burst signal are phase-inverted relative to the phase of the B-Y component every alternate line.

The operation of the comb filter is based on emphasizing periodic components in the signal by adding said signal to a signal which has been time-delayed in accordance with the periodicity of said signal. Every alternate line, the PAL signal exhibits a periodicity equal to two line periods H owing to the PAL-phase inversion.

The comb filter of FIG. 1 comprises an input 5 to which the PAL chroma signal $I_t$ is applied. Via a time delay network 1 having a time delay $\tau = 2H$, the signal $I_{t-2H}$, which has been delayed by two line periods, is applied to an adder circuit 2, which also receives the non-delayed signal $I_t$. The time delay 2H is adapted to the signal frequency in such a way that the carrier waves are added exactly in phase or subtracted in phase opposition. The sum signal $I_o = I_t + I_{t-2H}$ is available on an output 6.

FIG. 1B shows that the PAL chroma signal $I_t$ and the PAL chroma signal $I_{t-2H}$ which has been delayed by two line periods, are in phase as regards the PAL-phase, so that the sum signal $I_o$ is again a PAL chroma signal.

The filter of FIG. 1 can be employed in video recorders for suppressing crosstalk of chroma signals from tracks adjacent to a track being scanned. A disadvantage of this filter is that the time delay by 2 line periods H reduces the vertical resolution of the color picture and which gives rise to a vertical shift of the color picture, which effects are particularly annoying in those cases in which the comb filter processing is repeated, as in the case of the repeated copying of video tapes. These drawbacks are largely mitigated by the use of a comb filter having a delay time equal to one line period H.

Figure 2A:
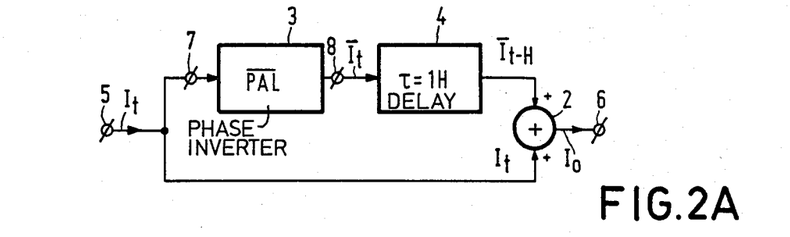
FIGS. 2A and 2B represent a comb filter in accordance with the invention, FIG. 2A showing the circuit diagram of this comb filter and FIG. 2B a diagram to illustrate the operation of this comb filter.
Figure 2B:
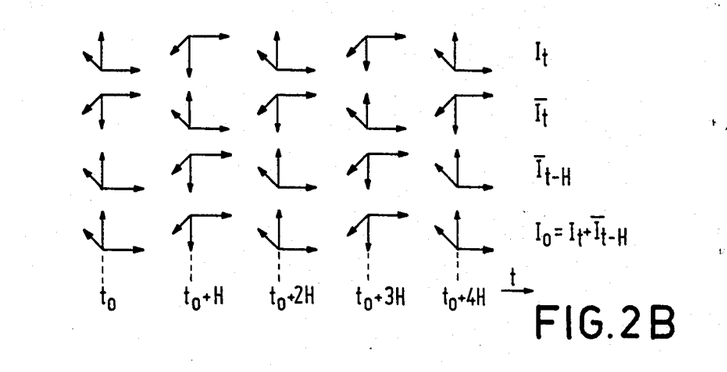

FIG. 2 shows a comb filter in accordance with the invention, FIG. 2A showing the circuit diagram of said filter and FIG. 2B some diagrams which illustrate the operation of said comb filter.

The PAL chroma signal $I_t$ is applied to the input 5 of the comb filter. Subsequently, it is fed to an input 7 of a PAL-phase inverter 3. The signal $\bar{I}_t$, whose PAL-phase has been inverted, is then available at an output of said inverter 3. By means of this PAL-phase inversion, the phase of the (R-Y) component and of the color burst CB relative to the (B-Y) component is inverted continuously, that is for all lines. Said signal $\bar{I}_t$ is applied to a delay network 4 having a time delay $\tau = 1H$ (H=line period), so that the chroma signal $\bar{I}_{t-H}$, which has been delayed by one line period and whose PAL-phase has been inverted, becomes available. In an adder circuit 2 said signal $\bar{I}_{t-H}$ is added to the original chroma signal $I_t$ and the signal $I_O = I_t + \bar{I}_{t-H}$ is available on an output 6, upon which addition the carrier waves of the signals $I_t$ and $\bar{I}_{t-H}$ are exactly in phase by adapting the time delay $\tau$.

It is evident from FIG. 2B that the signal $\bar{I}_t$, whose PAL-phase has been inverted after being delayed by one line period, again corresponds to the original chroma signal $I_t$ as regards its PAL-phase, so that the addition again yields a PAL chroma signal $I_o$, in which case, although the PAL chroma signal $I_t$ is periodic over a period equal to two line periods, a comb-filter action is obtained using a delay network having a delay equal to one line period. In the circuit arrangement of FIG. 2, it is to be noted that the PAL-phase inverter 3 may also be arranged after the delay network 4 or may be arranged in the transmission path other than that which includes the delay network 4.

Figure 3:
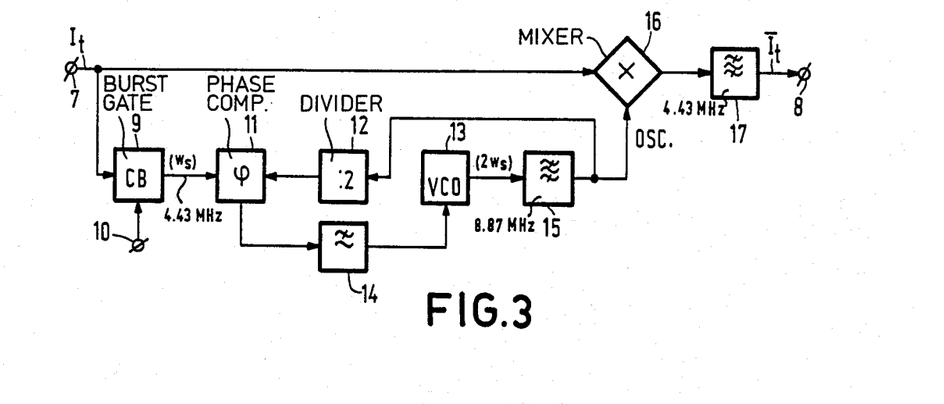
FIG. 3 shows a version of a PAL-phase inverter.

FIG. 3 shows an embodiment of a PAL phase inverter. It comprises an input 7, to which the PAL chroma signal $I_t$ is applied. Input 7 is connected to an input of a mixer stage 16 and to a burst gate 9, to which a pulse signal, which indicates the appearancy of a color burst, is applied via an input 10. A voltage-controlled oscillator 13, tuned to a frequency $2f_s$, $f_s$ being the frequency of the chroma subcarrier having an angular frequency $w_s$, supplies a signal to a divide-by-two divider 12. A phase comparison circuit 11 compares the phase of the color burst with the frequency-divided output signal of the oscillator 13 and, via a low-pass filter 14, controls the oscillator 13 so that the oscillator 13 is phase-locked to the burst. The output signal OSC of the oscillator 13 is applied to the mixing stage 16 via a band-pass filter 15 and is mixed with the chroma signal $I_t$. The output signal of the mixing stage 16 is applied to an output 8 via a band-pass filter 17. Said output signal $\bar{I}_t$ is the chroma signal whose PAL-phase has been inverted, which is apparent from the following calculation:

The PAL chroma signal $I_t$ complies with:

$$I_t = (B-Y)\sin(w_s t) \pm (R-Y)\cos(w_s t).$$

In this formula the $\pm$ sign of the (R-Y) component designates the two PAL-phases. The oscillator signal OSC then complies with the following relation:

$$OSC = -2\cos(2w_s t).$$

Here the polarity and the amplitude have been selected so that the (B-Y) component appears on the output 8 with a gain of $+1$. After filtration of the components of the angular frequency $w_s$ this yields: $\bar{I}_t = (B-Y)\sin(w_s t) \mp (R-Y)\cos(w_s t)$ for the output signal $\bar{I}_t = I_t \times OSC$. The sign of the (R-Y) component is then inverted. A similar calculation is valid for the color burst $-\sin(w_s t \pm (\pi/4))$, which is converted to $-\sin(w_s t \mp (\pi/4))$.

The comb filter for PAL chroma signals shown in FIG. 2 which includes a PAL phase inverter, is very suitable for use in the PAL chroma signal processing circuit of a video recorder, which will be illustrated hereinafter by means of the following consideration which eventually lead to the preferred embodiment of FIG. 8.

In a video recorder of the type in which the tracks are inclined relative to the longitudinal direction of the tape because the magnetic tape is helically wrapped round a head drum, the starting points of the tracks are offset from track to track. The ratio of this offset to the track length, which corresponds to one line period H of the video signal, is referred to as the H-alignment n. The sign of this factor n is negative by definition if the tape transport direction ($V_t$ in FIGS. 4, 5, 7 and 9) is opposite to the direction of movement of the video heads ($V_n$ in FIGS. 4, 5, 7 and 9).

Figure 4A:
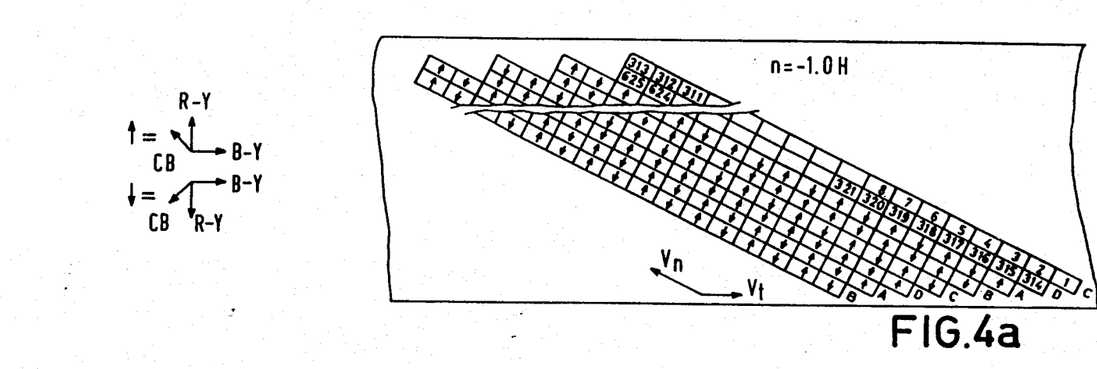
FIGS. 4A, 4B, and 4C represent some track patterns which may occur during the recording of video pictures, in which patterns the PAL phase is indicated.
Figure 4B:
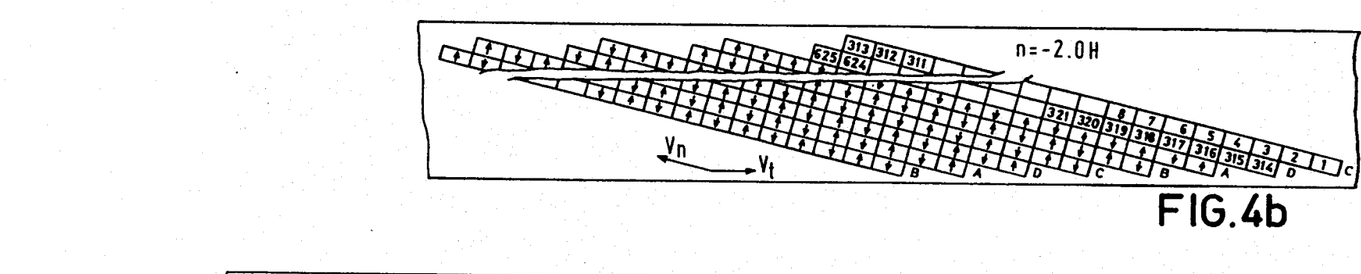
Figure 4C:
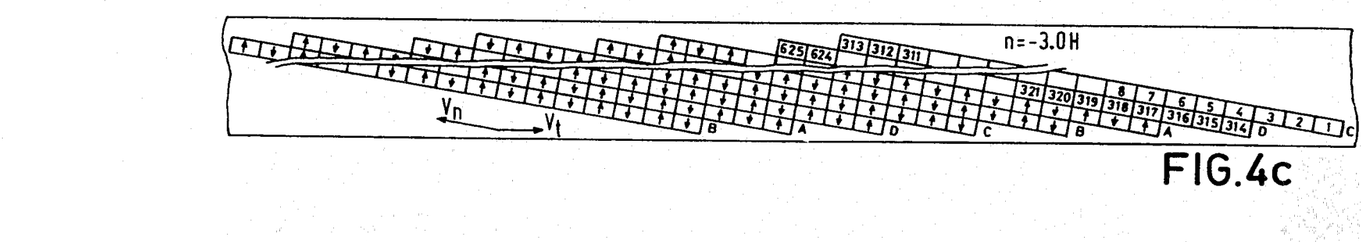

The first step relating to the track pattern is to select the H-alignment n in such a way that the line synchronizing pulses are arranged in line in directions perpendicular to the tracks, which is especially of importance in order to avoid time-base errors in the case of, for example, fast forward or reverse reproduction of video pictures. In a two-head recorder comprising two heads whose heads gaps are inclined relative to each other, it suffices if the line synchronizing pulses of all even-order tracks and of all odd-order tracks are in line. However, in order to avoid adverse effects owing to crosstalk, it is then favorable to align the line synchronizing pulses of all the tracks. This alignment can be achieved without the use of delay networks when the H-alignment n is an integral multiple of $+\frac{1}{2}$ or $-\frac{1}{2}$ (in the case of a two-head recorder). FIGS. 4a, 4b and 4c show the track patterns for $n=-1$, for $n=-2$ and for $n=-3$ in that case. It is to be noted that if n is a positive or negative integer, this is achieved by making the tracks A and C half a line longer than the tracks B and D. This is because a video picture of 625 lines, if equally divided between two tracks, would yield a non-integral number of lines per track, so that the H-alignment n would be alternately $n=0.5$ and $n=1.5$ (in the case of FIG. 4a)—which in principle need not be a problem. For the track patterns shown, the $313^{th}$ line, however, is each time recorded completely in the track corresponding to the first field of the video picture, which can simply be achieved by a suitable arrangement of the heads on the head disk.

Figure 5A:
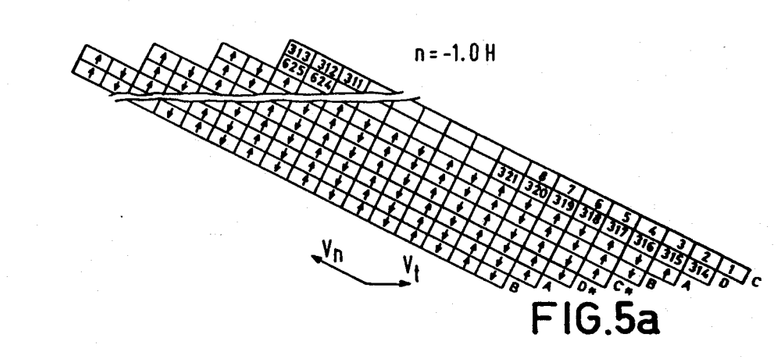
FIGS. 5A, 5B, and 5C show track patterns corresponding to the track patterns of FIG. 4 after the introduction of additional PAL-phase inversions.
Figure 5B:
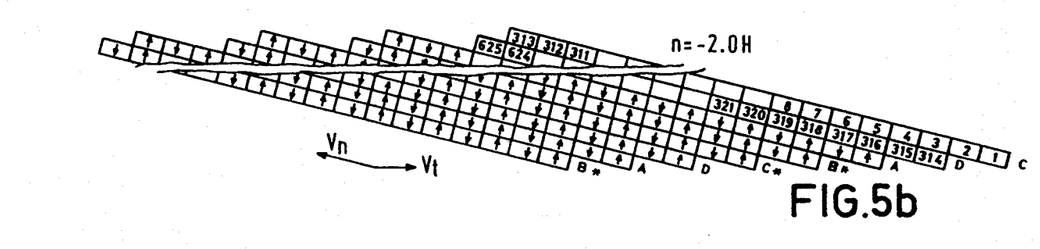
Figure 5C:
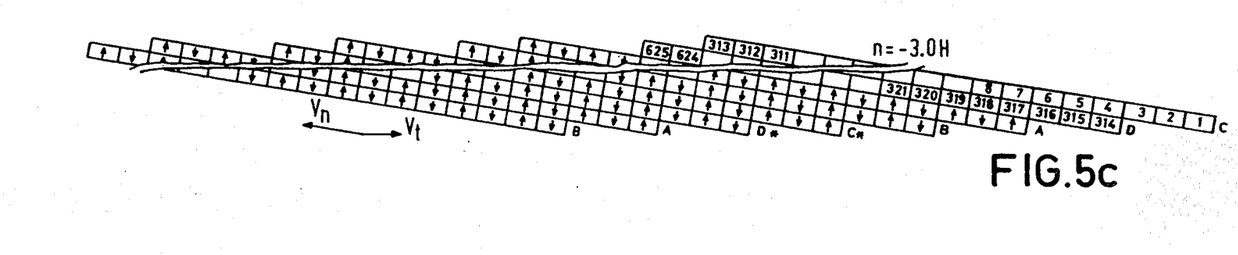
Figure 6:
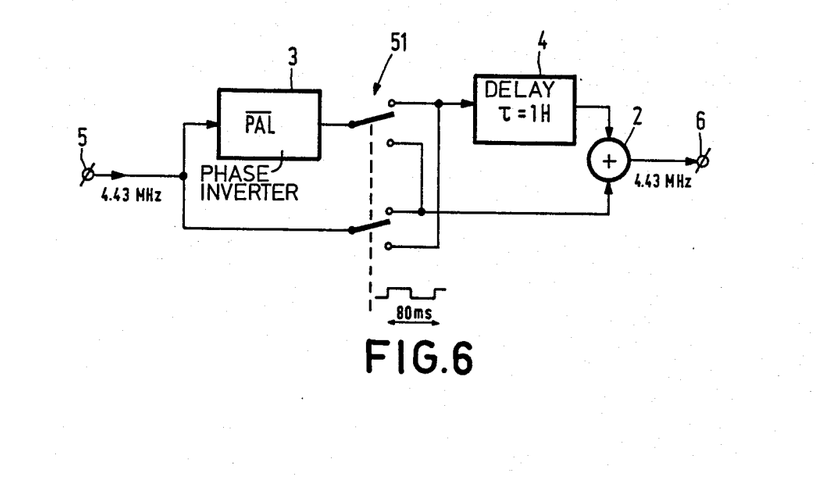
FIG. 6 shows an embodiment of a comb filter in accordance with the invention, in which the PAL-phase of the output signal may alternate.

When, in the track patterns of FIG. 4, the PAL-phase of lines which adjoin each other in directions perpendicular to the track direction is considered—which PAL phase is represented by arrows corresponding to the relevant PAL-phase in FIG. 4—it is found that the PAL-phases in directions perpendicular to the track direction are not in line. This gives rise to serious color errors in the reproduced video picture if, during a fast-motion playback mode, the heads scan the tracks obliquely. In the same way as for the alignment of the line synchronizing pulses, it is then essential to ensure that the PAL-phases of all tracks are aligned. In the same way as for the alignment of the line synchronizing pulses, it is possible, in video recorders comprising two heads whose head gaps are inclined relative to each other, to align the even tracks with each other and the odd tracks with each other. However, in this case it is also useful to align all the tracks relative to each other. One possibility of achieving this is to delay the chroma signal corresponding to the tracks just selected, but this gives rise to problems of color shifting. A more attractive solution is to invert the PAL-phase of the chroma signals corresponding to the lines just selected (which may readily be combined with the PAL-phase inversion for the comb filter as described with reference to FIG. 8). In the case of a definition of the tracks as in FIG. 4, these are the tracks C and D for $n=\pm 1, \pm 3, \pm 5 \ldots$ and the tracks B and C for $n=0, \pm 2, \pm 4, \ldots$. The resulting track patterns corresponding to the track pattern in accordance with FIGS. 4a, 4b, and 4c, respectively, are shown in FIGS. 5a, 5b, and 5c, respectively, in which the PAL-phase inverted tracks are marked with an asterisk. It is to be noted that during playback, said PAL phase inversion should be cancelled. An alternative possibility of avoiding the disturbing effect of the alternating PAL phase during reproduction of a track pattern in accordance with FIG. 4 when the tracks are scanned obliquely by the head, such as during fast-motion playback, is to detect the track alternation and to additionally invert the PAL-phase of the signal being scanned upon detection of such a track change. in this case, and in the case of the recording method described with reference to FIG. 5, it is necessary to additionally invert the PAL-phase of the signals from specific tracks. This can be achieved in a very advantageous manner in conjunction with the PAL-phase inversion for the comb-filter action. Apart from the preferred embodiment shown in FIG. 8, the circuit shown in FIG. 6 may for example be used for this. Said circuit corresponds to that of FIG. 2a, a commutator switch 51 being arranged between the PAL-phase inverter 3 and a delay network 4. Depending on the position of said switch 51, the PAL-phase is then inverted in the transmission path with the time delay network 4 or in the path which is parallel thereto. When the position of said switch is changed this results in an additional PAL-phase inversion for the output signal on output 6.

Figure 7A:
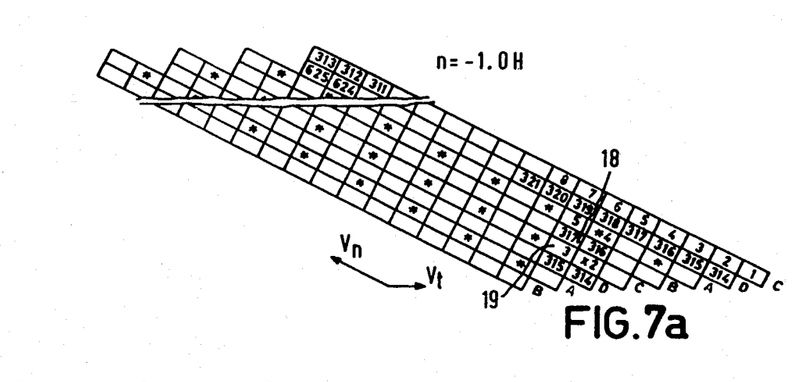
FIGS. 7A, 7B, and 7C represent track patterns corresponding to the track patterns of FIG. 4, in which patterns the polarity changes of the chroma carrier are indicated.
Figures 7B, 7C:
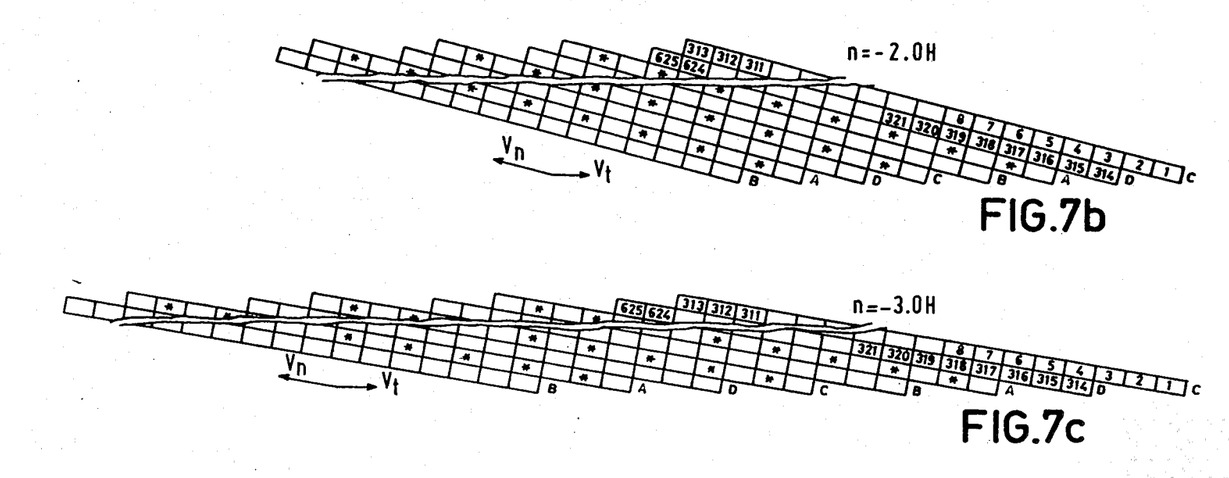

Another problem in video recorders where the tracks are arranged close to each other is the crosstalk of chroma signals. A known method of solving this problem is to invert the chroma-subcarrier phase in accordance with a suitably selected pattern, in such a way that the crosstalk components substantially cancel each other in the comb filter. When the comb-filter in accordance with the invention is used, a comb-filter delay equal to one line period H should be adopted. A suitable inversion pattern for the chroma subcarrier wave in the case of track patterns in accordance with FIGS. 4a, 4b and 4c is shown in FIGS. 7a, 7b and 7c, in which the lines with phase-inverted subcarrier are marked with an asterisk. This operates as follows:

If one head scans the line designated 18 in FIG. 7a, that is line number 317, the chroma signals of lines 316 and 317 of this track B are added in the comb-filter (FIG. 2a), while the crosstalk components of lines 4 and 5 of the adjacent track B and the crosstalk components of lines 2 and 3 of the adjacent track C substantially cancel each other. A similar situation occurs when scanning line 19 of Track D, while, when taking into account that the phase inversion of the subcarrier of line 2 of said track C is cancelled during reproduction, in which case the crosstalk components of lines 316 and 314 of the adjacent tracks B and D, respectively, are also inverted, the crosstalk components of lines 316 and 317 of the adjacent track B as well as the crosstalk components of lines 314 and 315 of the adjacent track D will substantially cancel each other.

Figure 8:
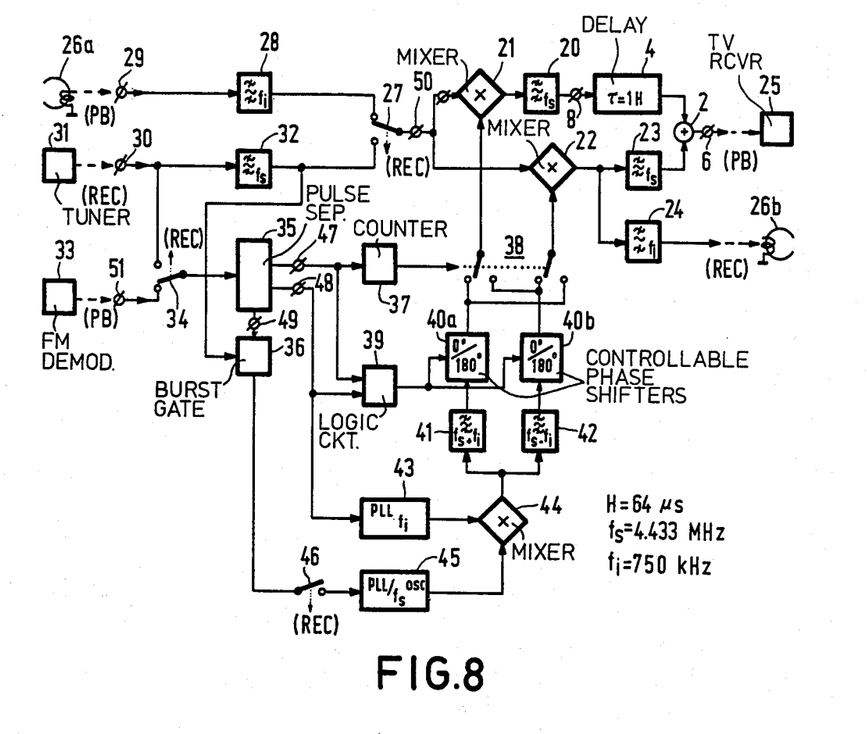
FIG. 8 shows a preferred version of a PAL color processing circuit including a PAL comb filter in accordance with the invention.
Figure 9A:
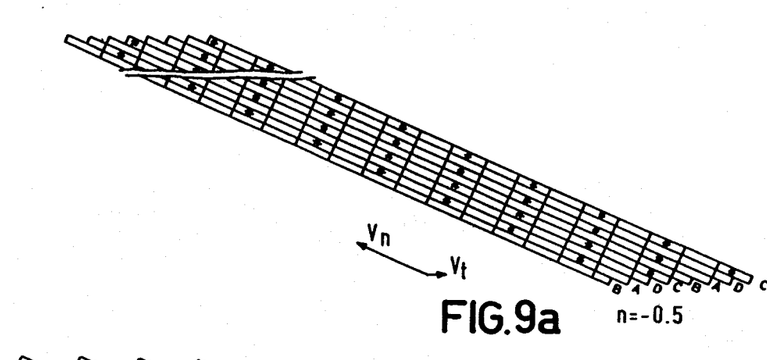
FIGS. 9A and 9B represent some track patterns in accordance with FIG. 6 but for different H-alignments n.
Figure 9B:
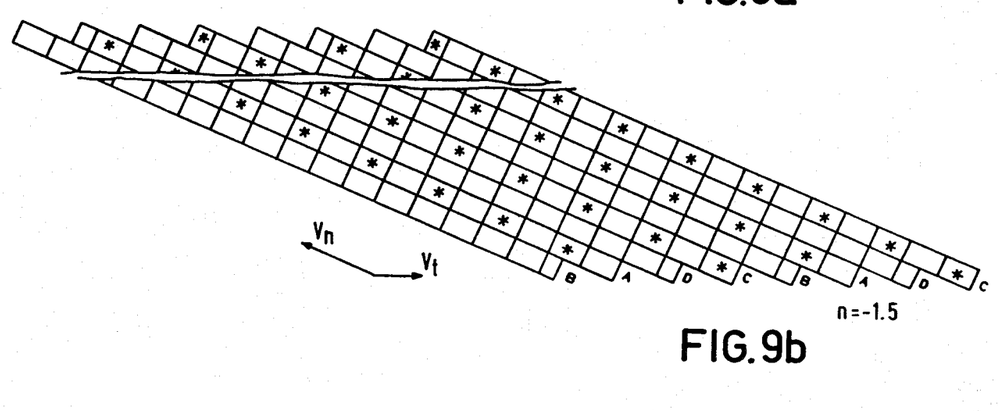

FIG. 8 shows a preferred embodiment of a PAL chroma processing circuit based on the foregoing. The situations during playback are designated (PB) and the situations during recording are designated (REC). The various switches, except for switch 38, are shown in the playback mode. The operation during playback is as follows:

In the comb-filter in the embodiment of FIG. 8 (compared with the embodiment of FIG. 2a), the function of the PAL-phase inverter (3 in FIG. 2a) is combined with the function of up-converting the chroma signal having a subcarrier frequency $f_i$ to a subcarrier frequency $f_s$ in mixing stage 21. The other transmission path of the comb-filter also includes a mixing stage 22. The desired mixing products of these mixing stages 21 and 22 are extracted by means of band-pass filters 20 and 23, which are tuned to the frequency $f_s$. The desired mixing product of mixing stage 21 is delayed by one line period H with the delay network 4 and in the adder network 2, it is subsequently added to the desired mixing product of mixing stage 22, so that on output 6 of the comb filter the filtered PAL chroma signal is available. The desired PAL-phase inversion and the inversion of the phase of the subcarrier wave $\cos w_s t$ are obtained in the two mixing stages 21 and 22 by appropriate processing of the mixing carriers for said mixers, which will be explained in more detail hereinafter.

Via a common input 50, a switch 27, which during playback is in the position shown, and a band-pass filter 28 tuned to the frequency $f_i$, the inputs of the mixing stages 21 and 22 are connected to an input 29. During playback (PB), the PAL chroma signal extracted from the video signal scanned by a playback head 26a—which in the case of two-head recorders alternates with a second head every other track being scanned—is applied to said input 29. In the video recorder system for which the circuit of FIG. 8 is intended, said PAL chroma signal is a modulated subcarrier wave of a frequency $f_i$, specifically 750 KHz. The output signal on output 6 of the comb-filter, which is a modulated carrier of the frequency $f_s$, specifically 4.4333 MHz, is further processed in the customary manner and is ultimately applied to a television set 25.

In the respective mixing stages 21 and 22 the applied PAL chroma signal, which is modulated with a carrier wave of the frequency $f_i$, is mixed with a carrier wave of the frequency $f_s+f_i$ and $f_s-f_i$, respectively, or with a carrier wave of the frequency $f_s-f_i$ and $f_s+f_i$, respectively, depending on the position of the switch 38. The result of this is obtained as follows:

The PAL chroma signal received at the input 50 may be represented by the following expression:

$$(B\text{-}Y) \sin w_i t \pm (R\text{-}Y) \cos w_i t \tag{1}$$

Mixing with $-\cos(w_s+w_i)t$ yields $$(B\text{-}Y) \sin w_i t + (R\text{-}Y) \cos w_i t \tag{2}$$

Mixing with $+\cos(w_s+w_i)t$ yields $$-(B\text{-}Y) \sin w_i t \pm (R\text{-}Y) \cos w_i t \tag{3}$$

Mixing with $\cos(w_s t - w_i t)$ yields $$(B\text{-}Y) \sin w_s t \pm (R\text{-}Y) \cos w_s t \tag{4}$$

Mixing with $-\cos(w_s t - w_i t)$ yields $$-(B\text{-}Y) \sin w_s t \pm (R\text{-}Y) \cos w_s t \tag{5}$$

The foregoing demonstrates that mixing with a signal of the difference frequency $f_s-f_i$ yields the original PAL chroma signal modulated with a carrier of the frequency $f_s$ and mixing with a signal of the sum frequency $f_s+f_i$ in addition also inverts the PAL-phase of the original PAL chroma signal. In this respect, it is to be noted that for the sake of simplicity, the color burst $-CB \sin(w_i t \pm (\pi/4))$ has not been included in the calculation. However, it is again possible to demonstrate that phase inversion takes place. Furthermore, the foregoing shows that the polarity change of the mixing signal causes a phase inversion of the subcarrier wave, or a polarity change of the modulated PAL chroma signal. In this way it is possible to obtain a PAL-phase inversion (see FIGS. 5 and 6 and description) and an inversion of the subcarrier phase (FIG. 7 and description). For this purpose the circuit of FIG. 8 comprises a mixing stage 44 which, by mixing a signal of the frequency $f_i$ supplied by a phase locked loop 43 and a signal of the frequency $f_s$ supplied by an oscillator 45, yields the sum frequency $f_s+f_i$ and the difference frequency $f_s-f_i$, which sum and difference frequencies are extracted by means of filters 41 and 42.

By means of controllable phase shifters 40a and 40b, the signs of the signals of the frequencies $f_s+f_i$ and $f_s-f_i$ thus generated can be inverted, and by means of switch 38, the mixing signals for the mixing stages 21 and 22 can be interchanged. The switch 38 is controlled in such a way that the PAL phase inversion applied during recording for the PAL-phase alignment (see FIG. 5 and description) is cancelled. In the absence of PAL phase alignment, it is also possible to ensure an undisturbed PAL phase sequence under control of a track-change detector, inter alia during fast-motion playback, modes by means of the switch 38. When it is assumed that the PAL chroma signal has been recorded in accordance with the pattern of FIG. 5a, the PAL phase should be inverted during each scan of the tracks C and D, namely in the present example in the two parallel paths of the comb-filter, that is, in the two mixing stages 21 and 22. In addition, the PAL phase of the signals should be continuously inverted in one of the two paths, in the present example in the mixing stage 21, in order to obtain the comb-filter action (see FIG. 2 and description), which two requirements are met by applying the mixing signal of the sum frequency $(f_s+f_i)$ to the mixing stage 21 and the mixing signal of the difference frequency $(f_s-f_i)$ to the mixing stage 22 during scanning of the tracks A and B, and—bearing in mind that two inversions, namely once for the comb-filter action and once for cancelling the PAL inversion during recording of tracks C and D is the same as non-inversion—by applying the mixing signal of the sum frequency $(f_s+f_i)$ to mixing stage 22 and the mixing signal of the difference frequency $(f_s-f_i)$ to the mixing stage 21 during scanning of the tracks C and D.

If recording is effected in accordance with the pattern of FIG. 7, the phase inverters 40a and 40b should be changed over at the beginning of each line during scanning of the tracks A and C, while during scanning of the tracks B and D, the phase inverter 40a should be switched on (because during mixing with the sum frequency, said mixing signal should be applied with inverted phase in order to obtain a signal with inverted PAL phase, without the phase of the subcarrier being inverted—for this see expression 2: "Mixing with $-\cos(w_s+w_i)t$").

In order to control the switch 38 and the phase inverters 40a and 40b in the correct manner, the circuit of FIG. 7 comprises an input 51 to which during playback the video signal, which is for example obtained from an FM-demodulator 33 is applied, from which video signal the horizontal and vertical synchronizing pulses are extracted by means of a pulse separator circuit 35, which pulses are available on outputs 48 and 47, respectively. The vertical synchronizing pulses on output 47, which appear once every track if in each track one television field is recorded, synchronize the operation of the switch 38 via a logic circuit 37 for example a counter, the circuit 37 being adapted so that the desired switching pattern of switch 38 is obtained. The horizontal synchronizing pulses on output 48 and the vertical synchronizing pulses on output 47 synchronize each change-over of the phase inverters 40 and 40b in accordance with the desired pattern via a logic circuit 39, for example comprising counters.

The horizontal synchronizing pulses on output 48 of the pulse separator circuit 35 are moreover applied to the phase-locked loop 43 for generating a signal of the frequency $f_i$, which frequency $f_i$ is in a fixed relationship with the line frequency (1/H).

During recording, the various switches are in the position designated (REC). In these positions, a video signal, for example supplied by a tuner 31 of a receiver or by a camera, is applied to an input 30, from which the PAL chroma signal, which is then modulated with a carrier wave of the frequency $f_s$, is extracted with a filter 32. Said PAL chroma signal is applied to the input 50 via the switch 27. During recording, only the mixing stage 22 of the comb-filter-and-mixing system arranged after the input 50 is used, which stage converts the PAL chroma signal to a carrier frequency $f_i$ and which also inverts the PAL phase and the sub-carrier phase in the correct pattern to obtain the recording patterns of FIGS. 5 and 6. Again it can be demonstrated that this is possible by using mixing signals of the sum frequency $(f_s+f_i)$ and the difference frequency $(f_s-f_i)$ and the inverse values of said frequencies, the correct signals being obtained in the correct sequence in the same way as during playback via the switch 38 and the phase inverters 40a and 40b. The desired output signal of mixing stage 22 is extracted by means of filter 24 and, after further processing, it is applied to a recording head 26b, which may be the same as the playback head 26a. Furthermore, during recording, the video signal applied to input 30 is applied to the pulse separator circuit 35 via a switch 34 in order to obtain vertical and horizontal synchronizing pulses. In the recording mode, via output 49 the pulse separator also supplies a color burst pulse to a burst gate 36 which, under control of the burst pulse, separates the color burst $-CB \sin(w_s t \pm (\pi/4))$ from the PAL chroma signal on the output of filter 32 and supplies it to the oscillator 45 via switch 46 in order to synchronize the signal of the frequency $f_s$ with the color burst, which also has a frequency $f_s$, by means of phase-locked loop techniques.

As regards the subcarrier-phase inversion every other line by means of phase inverters 40a and 40b during playback, it is to be noted that this is possible by counting the lines with a counter under control of the line synchronizing pulses on output 48 of the pulse separator circuit 35. By means of logic circuitry, the phase inversion of the carrier wave can than be controlled in such a way that said phase is inverted every other line. During the tracks (B and D in FIG. 7) in which no phase inversion is applied, said inversion process should then be interrupted. In the case of H-alignments with positive or negative integers of n, it is found that during the counting process, which has started on line A, an additional phase shift of 180° is required at the beginning of track C (because of the odd number of lines per video picture and because n is an integer. Whereas it is simple to distinguish between the tracks B and D on the one hand and the tracks A and C on the other hand, because these tracks are each time scanned by the same one of the two heads of a two-head video recorder, it is not readily possible to distinguish between tracks A and C in order to apply said additional phase inversion at the correct point. A known method is to also count the tracks and to detect an incorrect start by means of a detection circuit and to advance the counters in response thereto. In that case, said correction is not only applied in the case of an incorrect start but also in the case of an incorrect inversion cycle owing to interference. A disadvantage of this method is that it demands an additional circuit and that this correction is comparatively slow, so that annoying color-reproduction errors may occur for some time. A comparatively simple method is based on the fact that in situations in accordance with FIG. 7, the phase inversion cycle has a fixed relationship with the beginning of the track and consequently with the vertical synchronizing pulse. By locking the phase inversion cycle to the occurrence of the vertical synchronizing pulse (by means of a logic circuit 39 in FIG. 8), it is possible to ensure that the phase inversion cycle is correct at the beginning of each track A or C. A disturbance, if any, is then always corrected within the duration of one video picture, while no detection circuit is required to detect an incorrect phase inversion cycle. In the case of non-integral H line-ups n= ±0.5, ±1.5, ±2.5 ..., which situations are represented for n= −0.5 and n= −1.5 in FIG. 9, this solution is not entirely satisfactory. Although in these situations during counting of the lines it appears that the counting cycle continues from track A to track C without additional inversion (with a blocked inversion cycle via track B), it is necessary when the phase inversion cycle is locked to the vertical synchronizing pulse to make a distinction between tracks A and C, because the phase inversion cycle in track C is effected exactly the other way around relative to the beginning of the track in comparison with the scan of track A. However, a suitable track identification can be obtained when low-frequency tracking signals are recorded in the tracks in accordance with a system which is inter alia described in U.S. Pat. No. 4,297,733, issued Oct. 27, 1981, in accordance with which signals, whose frequency differs for each track, are recorded in every four consecutive tracks.

What is claimed is:

1. A PAL comb filter, for use in an apparatus for playing back video signals recorded in adjacent tracks on a record carrier for chroma cross-talk reduction by means of chroma carrier phase inversion, comprising a first and a second transmission path, input means for applying a PAL chroma signal to the two transmission paths, a delay network for delaying the PAL chroma signal in the first path relative to the PAL chroma signal in the other path, and a signal combination circuit for combining the PAL chroma signal in the second path and the PAL chroma signal delayed in the first path with the correct polarity relative to each other in such a way that the result of this combination is again a PAL chroma signal, characterized in that the delay network exhibits a time delay such that in the first path the PAL chroma signal is delayed by a time corresponding to one line of a video picture relative to the PAL chroma signal in the second path, and PAL-phase inversion means are included for inverting the PAL-phase of the signal in one of the two paths.

2. A PAL comb filter as claimed in claim 1, characterized in that the PAL-phase inversion means is controllable in such a way that the PAL-phase inversion is effected either in the first or in the second transmission path in response to a control signal.

3. A PAL comb filter as claimed in claim 2, characterized in that the PAL-phase inversion means comprises a first switchable PAL-phase inverter arranged in the first path and a second switchable PAL-phase inverter arranged in the second path, control means being provided for alternately switching on one of the two PAL-phase inverters in response to the control signal.

4. A PAL comb filter as claimed in claim 1 or 2, for use in a PAL video system in which the PAL chroma signal having a first carrier frequency is converted into a PAL chroma signal having a second carrier frequency, characterized in that the PAL-phase inversion means comprises frequency mixing means for mixing the PAL chroma signal having a first carrier frequency with a signal having a frequency equal to the sum of the first and the second carrier frequency, in such a way that mixing is effected in both transmission paths of the comb filter.

5. A PAL comb filter as claimed in claim 3, for use in a PAL video system, in which the PAL chroma signal having a first carrier frequency is converted into a PAL chroma signal having a second carrier frequency, characterized in that the first switchable PAL-phase inverter comprises a first mixing stage and the second switchable PAL-phase inverter comprises a second mixing stage for converting the PAL chroma signal having the first carrier frequency to the second carrier frequency, the control means comprises a mixing-signal generator for supplying a first mixing signal of a frequency equal to the sum of the first and the second carrier frequencies, and a second mixing signal of a frequency equal to the difference of the first and the second carrier frequencies, and further comprises switching means which can be switched over by said control signal for applying, in a first position, the first mixing signal to the first mixing stage and the second mixing signal to the second mixing stage, and for applying, in a second position, the second mixing signal to the first mixing stage and the first mixing signal to the second mixing stage.

6. A PAL comb filter as claimed in claim 5, characterized in that between the mixing-signal generator and the first mixing stage, there is arranged a first switchable mixing-signal-phase inverter and, between the mixing signal generator and the second mixing stage, there is arranged a second switchable mixing-signal-phase inverter for inverting the carrier phase of the PAL chroma signal of the second carrier frequency.

7. A PAL comb filter as claimed in claim 5 or 6, for use in a video system in which, for recording video signals, the PAL chroma signal having the second carrier frequency is converted into a PAL chroma signal having the first carrier frequency, characterized in that an output on which the PAL chroma signal of the second carrier frequency is available, is connected to an output of the second mixing stage via a band-pass filter which is tuned to the second carrier frequency.

* * * * *